(12) United States Patent
Wright et al.

(10) Patent No.: US 7,254,748 B1
(45) Date of Patent: Aug. 7, 2007

(54) ERROR CORRECTING CONTENT ADDRESSABLE MEMORY

(75) Inventors: Andrew J. Wright, Fremont, CA (US); Eric H. Voelkel, Ben Lomond, CA (US); Srinivasan Venkatachary, Sunnyvale, CA (US); Rochan Sankar, San Jose, CA (US)

(73) Assignee: NetLogic Microsystems, Inc., Mountain View, CA (US)

( * ) Notice: Subject to any disclaimer, the term of this patent is extended or adjusted under 35 U.S.C. 154(b) by 477 days.

(21) Appl. No.: 10/685,026

(22) Filed: Oct. 14, 2003

(51) Int. Cl.
*G06F 11/00* (2006.01)

(52) U.S. Cl. .............................. 714/43; 714/6; 714/42; 714/54; 711/108

(58) Field of Classification Search .................. 714/43, 714/54, 42
See application file for complete search history.

(56) References Cited

U.S. PATENT DOCUMENTS

| | | | | |
|---|---|---|---|---|
| 5,651,133 | A * | 7/1997 | Burkes et al. | ............... 711/114 |
| 6,012,131 | A | 1/2000 | Kang | |
| 6,268,807 | B1 | 7/2001 | Miller et al. | |
| 6,324,087 | B1 | 11/2001 | Pereira | |
| 6,366,978 | B1 | 4/2002 | Middleton et al. | |
| 6,385,071 | B1 | 5/2002 | Chai et al. | |
| 6,420,990 | B1 | 7/2002 | Voelkel | |
| 6,445,628 | B1 * | 9/2002 | Pereira et al. | ............... 365/200 |
| 6,512,684 | B2 | 1/2003 | Gordon et al. | |
| 6,542,391 | B2 * | 4/2003 | Pereira et al. | ................. 365/49 |
| 6,570,877 | B1 | 5/2003 | Kloth et al. | |

(Continued)

FOREIGN PATENT DOCUMENTS

EP 1517336 A2 * 3/2005

OTHER PUBLICATIONS

U.S. Appl. No. 60/429,559, filed Nov. 29, 2002, Roth.

*Primary Examiner*—Scott Baderman
*Assistant Examiner*—Loan Truong
(74) *Attorney, Agent, or Firm*—Shemwell Mahamedi LLP (57) ABSTRACT

A CAM and method for operating a CAM are presented. Copies of a CAM database are duplicated and placed in a first set of CAM locations and a second set of CAM locations. An error detector is used to determine false matches in the case of soft errors within the entries producing those false matches. While the entries producing a match should have the same index location, errors might cause those match lines to have an offset. If so, the present CAM, through use of duplicative sets of CAM locations, will detect the offset and thereafter the values in each index location that produces a match, along with the corresponding parity or error detection encoding bit(s). If the parity or error detection encoding bit(s) indicate an error in a particular entry, then that error is located and the corresponding entry at the same index within the other, duplicative set of CAM locations is copied into the that erroneous entry. Since duplicative copies are by design placed into the first and second sets of CAM locations, whatever value exists in the opposing entry can be written into the erroneous entry to correct errors in that search location. The first and second sets of CAM locations are configurable to be duplicative or distinct in content, allowing error detection and correction to be performed at multiple user-specified granularities. The error detection and correction during search is backward compatible to interim parity scrubbing and ECC scan, as well as use of FNH bits set by a user or provider.

31 Claims, 6 Drawing Sheets

U.S. PATENT DOCUMENTS

| | | | |
|---|---|---|---|
| 6,687,144 B2* | 2/2004 | Batson et al. | 365/49 |
| 6,700,810 B1* | 3/2004 | Ichiriu et al. | 365/49 |
| 6,751,755 B1* | 6/2004 | Sywyk et al. | 714/54 |
| 6,799,243 B1* | 9/2004 | Pereira et al. | 711/108 |
| 6,934,796 B1* | 8/2005 | Pereira et al. | 711/108 |
| 7,017,089 B1* | 3/2006 | Huse | 714/718 |
| 7,146,457 B2* | 12/2006 | Simha et al. | 711/108 |
| 7,171,595 B1* | 1/2007 | Huse et al. | 714/718 |
| 2003/0005210 A1* | 1/2003 | Thummalapally et al. | 711/1 |
| 2003/0142525 A1* | 7/2003 | Batson et al. | 365/49 |
| 2003/0196035 A1* | 10/2003 | Akkary | 711/108 |
| 2003/0202371 A1* | 10/2003 | Batson et al. | 365/49 |
| 2003/0225994 A1* | 12/2003 | Moniot et al. | 711/212 |
| 2004/0022082 A1* | 2/2004 | Khanna | 365/49 |
| 2005/0001744 A1* | 1/2005 | Roth et al. | 341/50 |
| 2005/0060631 A1* | 3/2005 | Driediger | 714/763 |

* cited by examiner

|   | A |   |   |   |   |   |   | B |   |   |   |   |
|---|---|---|---|---|---|---|---|---|---|---|---|---|
| 0 | 0 | 0 | 0 | 0 | 0 |   |   | 0 | 0 | 0 | 0 | 0 |
| 1 | 0 | 0 | 0 | 0 | 0 |   |   | 0 | 0 | 0 | 0 | 0 |
| 2 | 0 | 0 | 0 | 0 | 1 | X |   | 0 | 0 | 0 | 0 | 1 | Y
| 3 | 0 | 0 | 0 | 0 | 0 |   |   | 0 | 0 | 0 | 0 | 0 |

| 4 | 0 | 0 | 0 | 0 | 1 | 0 | 0 | 0 | 0 | 1 |
| 5 | 0 | 0 | 0 | 1 | 1 | 0 | 0 | 0 | 1 | 1 |
| 6 | 0 | 0 | 0 | 1 | 1 | 0 | 0 | 0 | 1 | 1 |
| 7 | 0 | 0 | 0 | 0 | 0 | 0 | 0 | 0 | 0 | 0 |

A(X) = B(Y) = 2; ! ERROR

FIG. 4A

| 0 | 0 0 0 0 0 |   | 0 0 0 0 0 |
| 1 | 0 0 0 0 0 |   | 0 0 0 0 0 |
| 2 | 0 0 0 0 0 | 1 MISS | 0 0 0 0 1 | 1 Y
| 3 | 0 0 0 0 0 |   | 0 0 0 0 0 |

| 4 | 0 0 0 0 1 | 1 X | 0 0 0 0 1 | 1 |
| 5 | 0 0 0 1 1 |     | 0 0 0 1 1 |   |
| 6 | 0 0 0 1 1 |     | 0 0 0 1 1 |   |
| 7 | 0 0 0 0 0 |     | 0 0 0 0 0 |   |

A(X) = 4; B(Y) = 2; ERROR
READ=> A(X), A(Y), B(X), B(Y)

FIG. 4B

| 0 | 0 0 0 0 0 | 0 | 0 0 0 0 1 | 0 HIT, Y
| 1 | 0 0 0 0 0 |   | 0 0 0 0 0 |
| 2 | 0 0 0 0 1 | 1 X | 0 0 0 0 1 | 1
| 3 | 0 0 0 0 0 |   | 0 0 0 0 0 |

| 4 | 0 0 0 0 1 | 0 0 0 0 1 |
| 5 | 0 0 0 1 1 | 0 0 0 1 1 |
| 6 | 0 0 0 1 1 | 0 0 0 1 1 |
| 7 | 0 0 0 0 0 | 0 0 0 0 0 |

A(X) = 2, B(Y) = 0; ERROR
READ=> A(X), A(Y), B(X), B(Y)

FIG. 4C

|   | A |   |   |   |   | P | FNH |   |
|---|---|---|---|---|---|---|-----|---|
| 0 | 0 | 0 | 0 | 0 | 0 | 1 | 1 |   |
| 1 | 0 | 0 | 0 | 0 | 0 |   | 0 |   |
| 2 | 0 | 0 | 0 | 0 | 1 | 1 | 0 | X |
| 3 | 0 | 0 | 0 | 0 | 0 |   | 0 |   |
| 4 | 0 | 0 | 0 | 0 | 1 | 1 | 0 |   |
| 5 | 0 | 0 | 0 | 1 | 1 |   | 0 |   |
| 6 | 0 | 0 | 0 | 1 | 1 |   | 0 |   |
| 7 | 0 | 0 | 0 | 0 | 0 |   | 0 |   |

|   | B |   |   |   |   | P | FNH |   |
|---|---|---|---|---|---|---|-----|---|
| 0 | 0 | 0 | 0 | 0 | 1 | 1 | 1 | X HIT |
| 1 | 0 | 0 | 0 | 0 | 0 | 0 | 0 |   |
| 2 | 0 | 0 | 0 | 0 | 1 | 1 | 0 |   |
| 3 | 0 | 0 | 0 | 0 | 0 |   | 0 |   |
| 4 | 0 | 0 | 0 | 0 | 1 | 1 | 0 | Y |
| 5 | 0 | 0 | 0 | 1 | 1 |   | 0 |   |
| 6 | 0 | 0 | 0 | 1 | 1 |   | 0 |   |
| 7 | 0 | 0 | 0 | 0 | 0 |   | 0 |   |

A(X) = 2, B(Y) = 4; ERROR
READ => A(X), A(Y), B(X), B(Y)
READ => FNH= "1" => A(0), B(0)

ERROR CORRECTING CONTENT ADDRESSABLE MEMORY

BACKGROUND OF THE INVENTION

1. Field of the Invention

This invention relates to a communication network, and the reliable routing of information across the network using lookup tables and content addressable memory. In particular, the present invention relates to an apparatus and method of searching a database having duplicative entries placed into the memory, noting which entry of the duplicative entries is erroneous, and copying a correct entry into the erroneous entry to achieve a more reliable search result. The present apparatus and method can extend to any prioritized set of associative rules applied in parallel, but for which error detection can occur serially.

2. Description of the Related Art

The following descriptions and examples are not admitted to be conventional by virtue of their inclusion within this section.

A communication network is generally recognized as an interconnection of forwarding devices that processes and sends packets of information across the network. One objective of the forwarding devices is to reliably forward the packets from a source to a destination. Thus, the network can either be an Internet or an Intranet and the forwarding devices can be gateways, bridges, switches, or routers.

In whatever form, a forwarding device typically includes one or more lookup tables. An incoming destination address or search key, derived from a packet of information, can be compared to entries stored within the lookup table. Resulting from the search, the associated packet of information may be processed according to a set of rules and sent to an appropriate port of the forwarding device. As links of the network change, routing protocols exchange information among the forwarding devices in order to change the entries within the corresponding lookup tables. This change will modify not only the entries within the lookup table, but also the next-hop identifiers or other associated data pointed to by the addresses of those entries. Routing through the forwarding devices can, therefore, be changed dynamically as links go down and come back up in various parts of the Internet or Intranet.

A popular implementation of the lookup table involves content-addressable memory (CAM). A CAM contains many CAM entries that are searched by a search key. One important feature of a CAM is that fairly fast searches can be undertaken of any database, list, pattern, image, or voice-recognition stored within a computer or a communication network. Contrary to conventional memory devices, CAMs do not store data in any structured fashion. The locations at which data is stored within a CAM can be arbitrary, where the data can be written directly into any location within the CAM. Once data is stored in CAM, that data can be found by comparing every bit within all of the CAM entries with input data placed in a comparand register. If a match exists for the set of values (i.e., binary or ternary bit values, depending on whether the values are bit-maskable) stored in a particular CAM entry, a match line is asserted for that entry. Thus, the match operation can take place within a single entry in a CAM (i.e., in the form of either a binary match, a ternary match, a range-based match such as a greater-than match, or any other kind of logical match function). A CAM thereby operates opposite that of a conventional memory device by receiving data and returning a CAM entry index, address, or location.

When searching in parallel all binary/ternary values (hereinafter, simply "values") across all CAM entries, multiple match lines might be asserted. The CAM typically includes one or more priority encoders that then translate the highest priority matching CAM index (or location) into a match address that is thereafter forwarded to discrete memory specified by that address. The discrete memory device may then direct the packet of information to the output port identified by that memory.

In order to reliably perform fast parallel searches, and to ensure the forwarding devices can correctly process and forward packets of information, the values stored in each of the CAM entries must not contain errors. Unfortunately, however, errors can occur when writing values into CAM entries. Errors can also occur in entries at any time after they are written. With the advent of smaller geometries and process skews, soft errors due to alpha-particle radiation, cosmic-ray radiation, and on-chip inter-symbol interference are likely to increase. The impact of such errors on normal CAM operation may be large due to the fact that all CAM locations are searched in parallel. A search operation on all CAM entries may provide an erroneous result due to two possible conditions: (i) an entry being searched contains one or more errors causing it to incorrectly match the comparand data ("false-hit" condition); or (ii) an entry being searched contains one or more errors causing it to incorrectly mismatch the comparand data ("false-miss" condition). Such errors can, in most instances, be eliminated by simply rewriting the proper values into an entry having improper values. Such rewriting of erroneous entries may be facilitated in the forwarding device by the intervention of an external central processing unit (CPU). However, before the errors can be fixed, the erroneous entries in the CAM must first be detected. Moreover, the time taken for such detection and correction of erroneous CAM entries by the forwarding device may be sufficiently large such that erroneous CAM entries adversely affect the reliability, correctness, and performance of the forwarding device.

It would be desirable to provide a circuit and method to detect erroneous values within a CAM during a search operation, isolate which entries contain those erroneous values, and then correct those erroneous values during or immediately following the search operation. By performing error detection, identification, and correction as an entry is being searched, one can be assured that the search cannot produce erroneous results, and that the impact to the forwarding device's performance is minimized.

SUMMARY OF THE INVENTION

The problems outlined above are in large part solved by an improved CAM and method of operating the improved CAM so that erroneous CAM entries can be detected, identified, and corrected in a pipelined fashion with normal CAM search operation. In addition to its error-detecting and error-correcting capability during a search operation, the present CAM also supports scan for single and/or multiple bit errors between search operations. The combination of detecting, identifying, and correcting erroneous CAM entries during both a search operation, and in the interim between searches, provides a more reliable CAM.

The present CAM includes multiple blocks of CAM entries. At least two blocks are designed to contain duplicative CAM entries. In other words, whatever values are written to the first block will be replicated (or mirrored) and written also into the second block. The first and second blocks are thereby duplicates or mirrors of one another. For example, a 20 Mb CAM may contain 64 blocks of 4 K CAM entries. If two blocks are mirrored, then the remaining 62 blocks may not be mirrored. Alternatively, 32 blocks can be mirrored and the combination of the mirrored 32 blocks will then represent all 64 blocks of the 20 Mb CAM. The present invention allows for the allocation of mirrored CAM blocks on a programmable per-block basis, in order to maximize the usable CAM space for unique lookup tables.

When performing a search, both the original and duplicative CAM entries are searched in parallel and the results are compared. If the result within the main block produces a match at an index location different from the resulting match in the duplicative block, then an error is detected for that search operation. Knowing an offset exists between the search results in the first (main) and second (duplicative) parts of the CAM, error checking is then performed at both index locations within the first and second CAM portions in order to identify which CAM entry and associated set of values is in error. Since there are two (duplicative) CAM portions and two indices separated by an offset, four CAM entries and their associated parity and/or error detection encoding bits must be read. The read operation is undertaken within a small, fixed number of clock cycles immediately following the search operation or at any later interim between search operations. Once the erroneous index location is identified, values at the same index location within the other CAM portion are copied into the erroneous location to complete the error correction feature.

According to one embodiment, the CAM includes a first set of CAM locations and a second set of CAM locations. The second set of CAM locations ideally store values that are duplicative of those stored in the first set of CAM locations. Unfortunately, however, errors may occur. If so, one or more sets of values stored in indices of the first set of CAM locations may be different from values stored in corresponding indices of the second set of CAM locations. The CAM will detect such errors during a search operation by employing a comparator. The comparator is coupled to compare a search key against the first and second sets of values within the corresponding first and second sets of CAM locations. The comparator will report an error if a first priority location (or index) within the first set of CAM locations produces a match that is different from a first priority location (or index) within the second set of CAM locations. If the indices do not have the same index value, then those indices are said to be offset from one another. Any offset will be reported as an error, thus completing the error detection feature.

According to another embodiment, an error location circuit is provided to compare a parity bit corresponding to each of the first and second sets of values against those values. The error location circuit will record, resulting from the compare operation, whether the error is within the first set of values or the second set of values. Depending on where the error exists, the erroneous values are written over by the non-erroneous values in the corresponding index of the other (duplicative) set of CAM locations.

According to yet another embodiment, a method is provided. The method includes searching for matches between a key and duplicative sets of values within respective first and second sets of CAM locations. If the sets of values are not duplicative due to soft errors or errors in general, an offset will result between matches in the first and second sets of CAM locations. That offset will cause an error indication to be generated.

The present CAM and method for correcting errors supports different size CAMs, as well as CAMs that may only have duplicative entries in a portion thereof. The forwarding device may programmably select which lookup tables require error detection and correction and thereby create duplicative entries for only a specified subset of the CAM blocks on the chip. Moreover, the present CAM supports use of hit suppression bits, often referred to as "force-no-hit" bits. The force-no-hit (FNH) bits may be used by the forwarding device to prioritize particular routing paths. For example, by setting the FNH bit within a range of entries, any matches or "hits" within an entry having the FNH bit set will suppress that hit and subsequent hits within the corresponding block of entries. In this fashion, entries having their hit suppressed will not forward a match to the priority encoder that will then address routing associated with a particular output port. This will thereby force routing according to a policy-based routing mechanism, for example. By additionally outputting the information on where a hit was found which was subsequently suppressed by a FNH, this error detection/correction mechanism can be made applicable to a CAM that supports the FNH functionality.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF PREFERRED EMBODIMENTS

Figure 1:
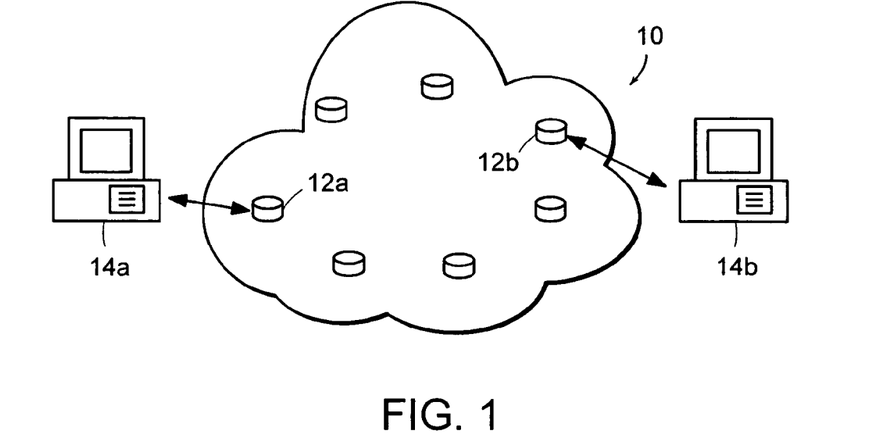
FIG. 1 is a plan diagram of a communication network.

Turning now to the drawings, FIG. 1 illustrates a communication network 10. The topology of the Internet or Intranet interposed between computers or multimedia devices 14 can vary. If device 14a wishes to send a packet of information to device 14b, then it must do so by traversing one or more forwarding devices 12 within network 10. Forwarding device 12a might receive the packet that includes a destination address of, for example, forwarding device 12b (or device 14b). Determining where to send the packet within network 10 so that the packet arrives at a forwarding device (or hop) closer to the destination is one of several possible functions of a lookup table within the forwarding device 12a. In one such embodiment, the lookup table within device 12a may receive the destination address and will compare that address or key to entries stored within the lookup table. Associated with each entry might be an address which points to a next hop identifier. Thus, once an entry matches using, for example, a longest prefix match comparison with the destination address, then the packet is routed to the next hop closer to the destination.

Figure 2:
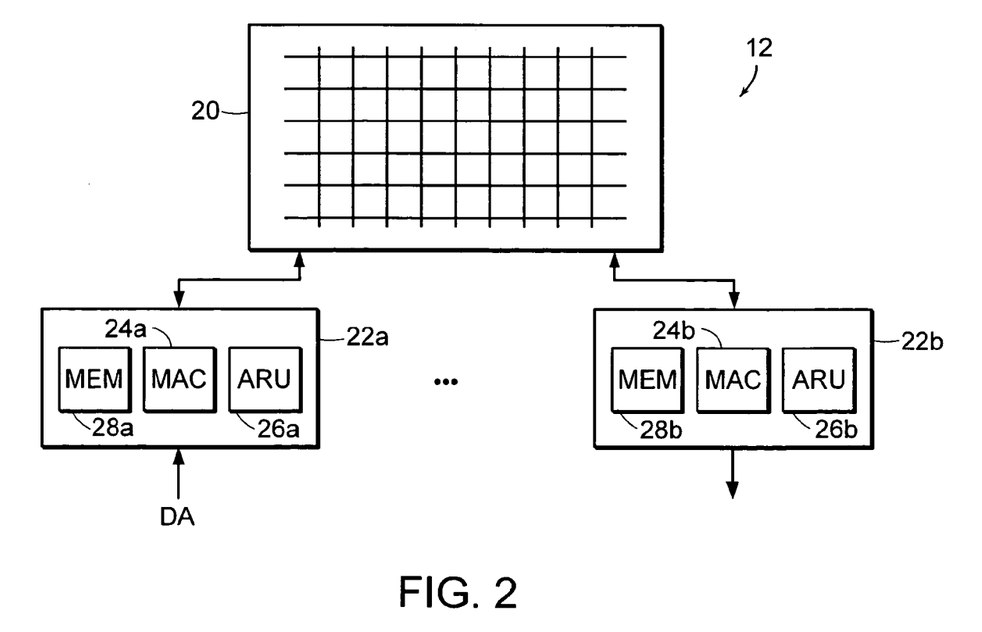
FIG. 2 is a block diagram of a packet-forwarding engine (e.g., router, gateway, bridge or switch) within the communication network of FIG. 1.

FIG. 2 illustrates one example of a forwarding device 12 such as a router, gateway, bridge, or switch. Forwarding device 12 is often called a packet-forwarding engine and may contain a switching fabric 20 and a plurality of line cards 22. Switching fabric 20 is generally well known and may involve a crossbar switch that interconnects all the line cards with one another. At least one line card may contain a routing processor. Forwarding device 12 can, therefore, be thought of as performing two functions: (i) performing route lookup based on the destination address of the packet in order to identify an outgoing port; and (ii) switching the packet to the appropriate output port.

The routing function can be performed primarily on the incoming line card (e.g., line card 22a) and the switching of the packet to the appropriate output port or line card can take place within switching fabric 20. The destination address (DA) of the packet can enter line card 22a via an I/O interface. Each line card typically includes a Media Access Controller (MAC) 24, Address Resolution Unit (ARU) 26, and a memory device (MEM) 28. MAC 24 can be configured to accept many different communication protocols, such as CSMA/CD, FDDI, or ATM communication protocols. As packets are read from ingress MAC 24a, forwarding control information necessary for steering the packet through switching fabric 20 will be prepared and/or appended to those packets.

The ARU 26 at the ingress line card preferably performs the routing function using the longest prefix match comparison technique. The ARU can perform classless or class-based routing functions and can support Variable-Length Subnet Masks (VLSM). Each ARU can be reconfigured as routes are added or deleted from the network using well-known routing protocols, such as RIP, OSPF, or BGP. The memory device 28 can be implemented in various types of Random Access Memory (RAM), such as DRAM, SRAM, or CAM, a popular form of masking CAM being Ternary CAM (TCAM). Memory 28 can contain the lookup tables. If the lookup tables are placed within the line card 22, lookups on the incoming packet can be performed locally, without loading the central processor of the forwarding device 12.

Figure 3:
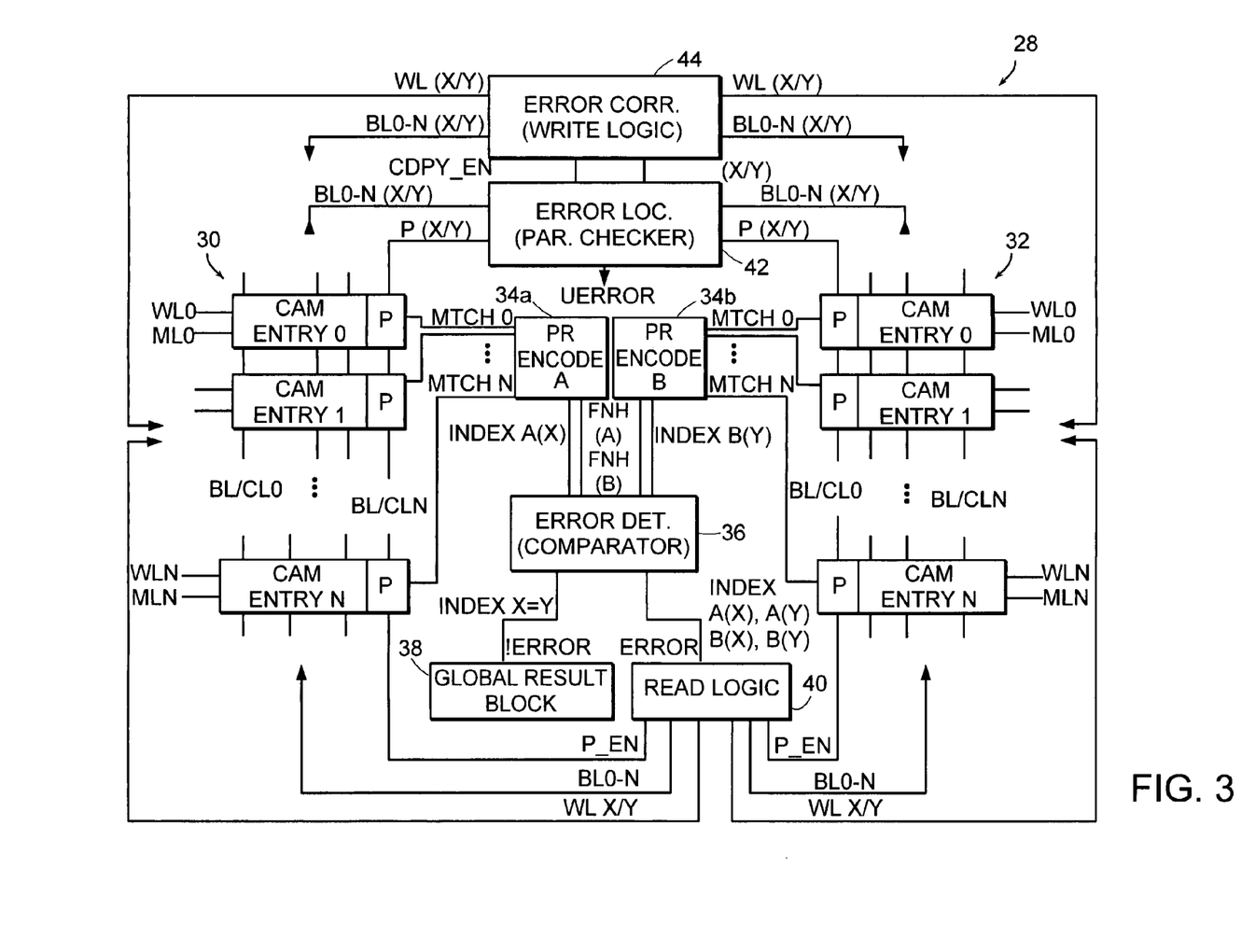
FIG. 3 is a block diagram of the packet-forwarding engine and associated CAM with error detection circuitry, error location circuitry and error correction circuitry.

Turning now to FIG. 3, various portions of memory 28 according to one embodiment are shown. For sake of clarity and brevity in the drawings, not all portions of the search engine that supports memory 28 are shown. For example, a CPU, Network Processor (NPU), or Application Specific Integrated Circuit (ASIC) is typically involved to write instructions to configuration registers of a search engine. The instructions are used to configure a corresponding state machine with information regarding the scope and nature of a search operation. The instructions can also be used to program one or more mask data/comparand data pairs to define the search. The mask bits are essential when using a ternary-capable CAM device. The state machine can then access the lookup table CAM 28 via a conventional memory interface and can, for example, load the resulting data to be searched into search FIFO buffers, where it is then passed back to the CPU, NPU, or ASIC via configuration registers and a CPU, NPU, or ASIC interface in a conventional manner.

In accordance with one embodiment, the lookup table CAM 28 is shown to include multiple CAM entries 30 and 32. The CAM entries are bifurcated into two sets of duplicate CAM entries: one labeled 30 and the other labeled 32. The first set of CAM entries 30 have the same address or index value as the second set of CAM entries. In other words, when the CAM is being written to or programmed, whatever data is written to index location 0 of first set 30 will also be written to index location 0 of second set 32, and so forth for all indices 0-N. Accordingly, instead of having only one set of CAM index locations that receive values, CAM 28 has two sets of CAM index locations that receive duplicative values. Those values stored within CAM 28 represent the lookup table information.

Each CAM entry includes 0-N CAM cells. The cells of a particular CAM entry can be programmed in parallel by asserting the Word Line (WL) and the corresponding Bit Lines (BLs). The CAM cells can be ternary cells or TCAM cells. If so, the information needed to implement mask values and data values are read and/or written as separate words. Once programmed, a search key or comparand data can be placed on the Comparand Line (CL). If every value placed on CL0-N matches with every value stored in a particular CAM entry, then a corresponding Match Line (MTCH) for that entry will be asserted.

Ideally, there are no errors that occur during programming of the CAM entries and since the values at each location index are programmed the same, whatever match line is asserted in the first set of CAM locations 30 will also be asserted in the second set of CAM locations 32. Unfortunately, however, there may be errors prior to or during the CAM 28 operation that causes different values to be stored at the same location index within the first and second sets of CAM locations 30 and 32. If such is the result, then that error can be easily detected during the search operation and subsequently corrected.

During the search operation, there may be two or more match lines asserted. Priority encoders 34a and 34b are used to select the match line having the highest priority for the respective CAM locations 30 and 32. There are numerous ways in which the priority encoders can be programmed. In one embodiment, the priority encoder selects an index location that may include the lowest physical address of the CAM entries. For this example, if a match occurs at index location 1 and index location 5 of CAM location 30, priority encoder 34a will select index location 1. There are numerous ways in which priority encoders 34a and 34b can select from among a plurality of asserted match lines depending on the policy set within priority encoders 34a and 34b. The lowest physical address is only one such way. Regardless of the policy, however, encoders 34a and 34b will always each select one match line from possibly numerous match lines based on some form of priority selected by the user.

Once priority encoders 34a and 34b select the highest priority index locations, they will present their respective index values to an error detector 36. Each set of CAM locations 30 and 32 may have one or more priority encoders, and the results of said priority encoders may be combined with one or more global priority encoders. By showing a single priority encode block per CAM location, FIG. 3 is presented merely as a conceptual rendering of the overall function, rather than specific to the actual physical implementation. The first set "A" is given an index value of X, whereas the second set "B" is given an index value of Y. If there are no errors, then whatever match line is asserted in the first set 30 will result in the same index value as the match line asserted in the second set 32. Thus, index A(X) will equal index B(Y) as determined by the comparator of error detector 36. Thus, no error (!ERROR) is asserted and the index X=Y is presented to the global result block 38 of the CAM.

Conversely, if index A(X) does not equal index B(Y), then detector 36 not only presents an error signal to read logic 40, but also presents the index values A(X),B(Y) and the corresponding, ideally duplicative index values B(X) and A(Y). Read logic 40 will receive those values and assert the corresponding word lines (WLs) for the X and Y indices in both the A and B sets of CAM locations 30 and 32, respectively. Additionally, read logic 40 can enable the parity or error correction code (ECC) bit(s) within each of the label "P" within each of the CAM entries by asserted P_EN. The parity or ECC bit(s) are part of the CAM word itself, and are read/written along with the corresponding CAM word. Read logic 40 can initiate the appropriate read cycles, in this example 4, to read out the bit lines 0-N for the entries corresponding to indices X and Y in both sets of CAM locations 30 and 32, denoted as BL0-N(X/Y). Those read bits are placed within error location detector 42. In addition to the bit lines of the appropriate indices being read, the parity or ECC bit(s) of those indices X and Y in both sets of CAM locations 30 and 32 are also read and placed into error location detector 42, as shown by signals P(X/Y).

Upon reading the bit lines and parity or ECC bit(s) associated with each of indices X and Y, the read entries are compared using a parity or ECC check mechanism to determine which entry among the four entries is in error. For example, the entry at index A(X) may be in error as a result of the parity check algorithm, while all other entries: A(Y), B(X), and B(Y) are not in error. Using this example, a COPY_EN signal is asserted by error location detector 42, representing an instruction to copy the binary values of entry B(X) into the erroneous entry A(X). Knowing that A(X) and B(X) should have the same binary values since ideally they are copies of one another, any errors in index A(X) can be corrected by copying from index B(X). Error correction circuit 44 will effectuate the copy operation by carrying out a write cycle. Using the above example, error correction circuit 44 will assert the appropriate word line, in this case the word line at index X and copy the binary values of entry B(X) into the entry A(X). Although the probability of such an event is statistically very low, it is possible that both A(X) and B(X), or both A(Y) and B(Y), fail the parity/ECC check. In this case, the errors are uncorrectable by the CAM and a signal (UERROR) is sent to the CPU, NPU, or ASIC to which the CAM is attached, indicating that there is an uncorrectable error detected at location X (or Y). The UERROR signal is intended to request the system utilizing the CAM to rewrite the entry X (or Y) with correct data.

Figure 4A:
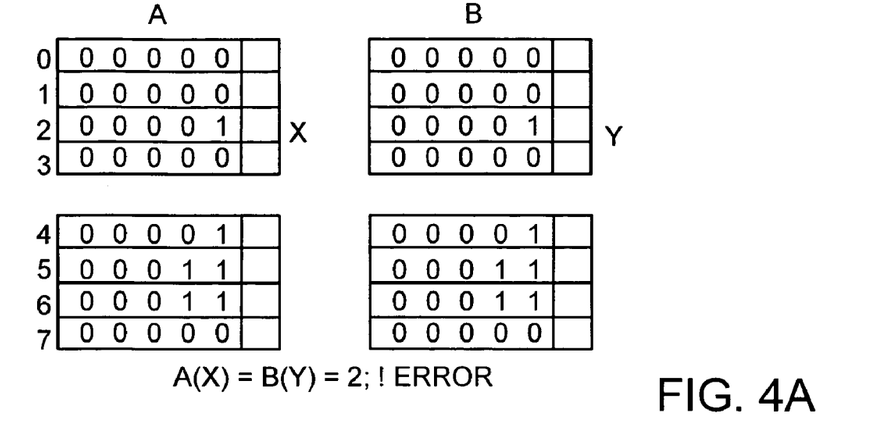
FIGS. 4*a*-4*c* are tables showing examples of error detection, error location identification and error correction.
Figure 4B:
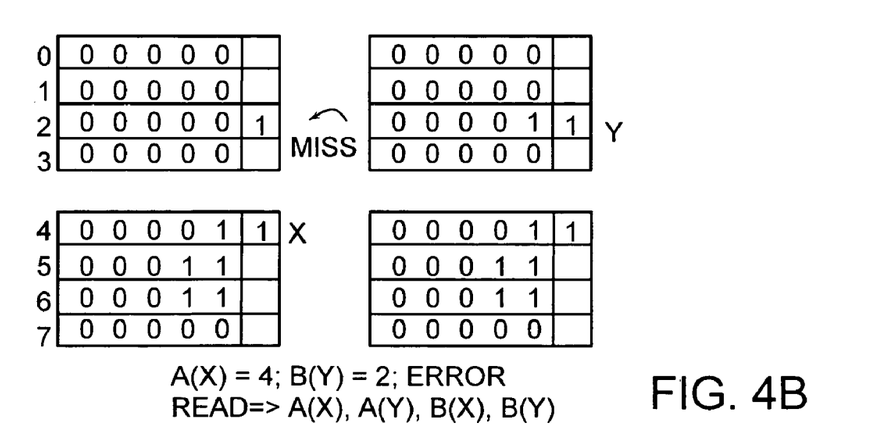
Figure 4C:
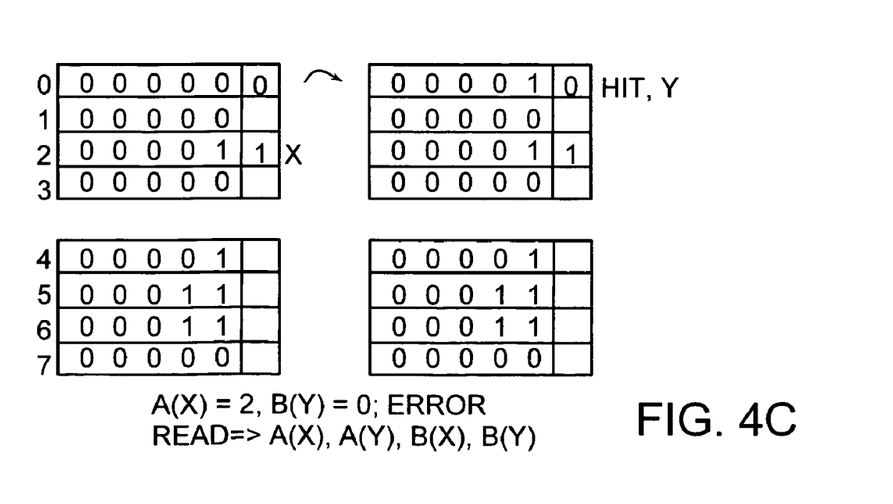

The various ways in which errors can be detected, identified, and corrected can be better described using a rather simplistic example set out in FIGS. 4a-c. If, for example, a search key binary value 00001 is used, then in FIG. 4a, a match will occur at index value 2 in both the first and second sets of CAM locations labeled "A" and "B," respectively.

Thus, in the example of FIG. 4a, there is no offset between the index values X=Y=2. Since in this example the first entry is prioritized by the priority encoder, index value 2 is selected before the next match location at index value 4.

Converse to FIG. 4a, FIG. 4b illustrates an example in which an error is detected. Instead of index A(X)=2 having a binary value 00001, a binary value 00000 is recorded. Due to certain soft errors existing at that location, an improper set of binary values is recorded. Thus, when the search operation is performed, a match line at index A(X)=2 will not occur and a "MISS" results at that location. However, index value B(Y)=2 will record a match line asserted and index A(X)=4 will also record a match line asserted. Referring back to FIG. 3, the priority encoder 34a will then output index A(X)=4 and priority encoder 34b will output index B(Y)=2, whereby error detector 36 will note an offset of 4−2=2 and an error signal will result from detector 36. In addition to producing an error signal, error detector 36 will also note that a read operation must occur at index values A(X), A(Y), B(X), and B(Y).

Read logic 40 will then assert the appropriate word lines in both the A and B sets of CAM locations and, particularly, at both the X and Y index locations. This will cause not only the binary values to be read, but also the parity values, shown in the example of FIG. 4b as a single bit binary value "1," in each of the four read locations. When combined with the binary values of the CAM entries, the parity bits will note which CAM entry is in error. In the present example, the combination in indices B(Y), A(X), and B(X) yields a parity check of 1+1=0, yet the parity check at index A(Y) yields a parity outcome of 0+1=1. Thus, it is determined that the entry at A(Y) is in error. Error location detector 42 determines that error based on parity checking, and error correction circuit 44 will copy the values at index B(Y) into index A(Y).

FIG. 4c illustrates yet another example in which a match occurs at index B(Y)=0 and at index A(X)=2. Since an offset exists, an error will be reported and the corresponding four entries and associated parity bits will be read. A parity checking operation will be undertaken to note that even though a match occurs at index B(Y)=0, that entry was an error and the corresponding entry from A(Y)=0 is copied into index B(Y)=0, so that when a subsequent search occurs, a hit will not be recorded at B(Y)=0 and, instead, the first match will occur at B(Y)=2.

It is important that the nomenclature be set out clearly in that the first set of CAM locations is denoted as CAM locations 30 (FIG. 3) or "A" (FIGS. 4a-c). The second set of CAM locations are denoted as reference 32 (FIG. 3) or "B" (FIGS. 4a-c). A first set of binary/ternary values are the values within a particular CAM entry and are denoted as those contained in the first set of CAM locations. The first set of values is those which are discovered first by the priority encoder 34a and are denoted as an index value of X. A second set of values are those associated with the second set of CAM locations and is the first match line discovered by the priority encoder 34b, and denoted as having an index value of Y. Whenever a search is undertaken of a search key against the first and second sets of binary values, an error will be recorded if a match results in corresponding index values of X and Y are different from each other (i.e., at an offset relative to one another). FIG. 4a illustrates no offset and thus no error; FIGS. 4b and 4c illustrate an offset and thus an error.

Figure 5:
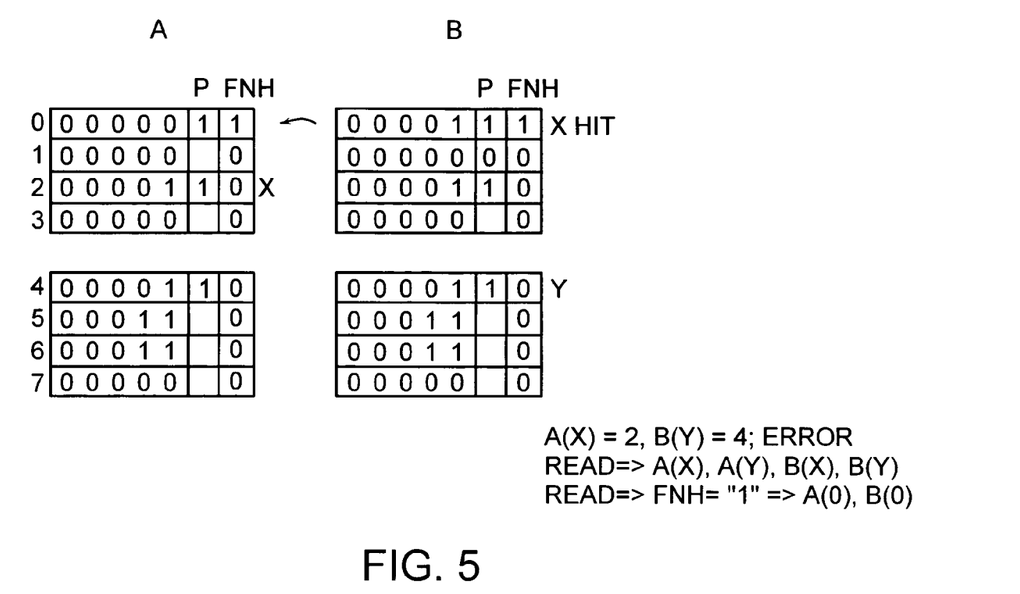
FIG. 5 is a table showing an example of error detection, error location identification and error correction where a FNH bit is implemented.

There may be instances in which the lookup table implements certain policy-based routing mechanisms set by a user or a provider of that user. An example of such a policy might be to give priority to one user versus other users. FIG. 5 illustrates one example whereby a policy can be established based on a "Force-No-Hit" (FNH) bit. Whenever an FNH bit is set, any match that might occur at the index location having a set FNH bit will suppress that match or hit.

In the example shown, FNH bit is set at index location 0. Thus, whenever a search key of 00001 is applied, index B(Y)=0 will indicate a match. However, since FNH bit is set, that match or hit will be suppressed. This will force the priority encoder 34*b* from FIG. 3 to disregard all matches within the block that, in the example of FIG. 5, represents index values 0-3. The first match subsequent to block having indices 0-3 is at index B(Y)=4. However, since there was no hit at index A(X)=0, then the FNH bit set at that location will not need to suppress a hit, nor at subsequent locations within that block. Therefore, the next match location at index A(X)=2 will be recorded. Since an offset exists between index A(X)=2 and index B(Y)=4, an error will be reported.

Figure 6:
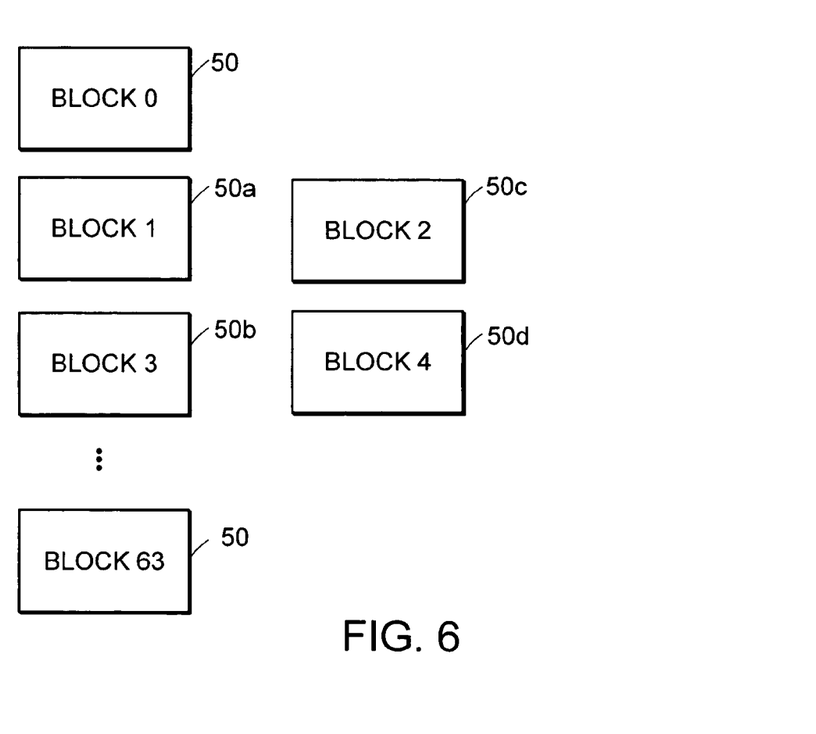
FIG. 6 is a block diagram of CAM entries segregated into blocks, with a subset of blocks having duplicative entries for implementation of error correction exclusive to that subset.

Parity checking will then ensue at indices X and Y in both the first and second sets of CAM locations. As will be discovered, there most likely will be no parity errors at those indices since, in actuality, the error occurs at index 0 within the first set of CAM locations A. In order to support the FNH outcome, once no parity error is discovered at indices X and Y, the matching index within the set of CAM locations having the FNH bit set must also be read, along with the parity bit. To facilitate this, when the CAM block suppresses a match due to a FNH, it reports that information. More specifically, if the priority encoder 34*a* or 34*b* detects a search miss due to FNH for its associated set of CAM locations, priority encoder 34*a* or 34*b* will assert the FNH flag and output the match location suppressed by FNH to the error detection circuit 36. Resulting from the read logic and parity checking operation, it will be discovered that the values in index A(0) are in error and subsequently the binary values within entry B(0) are copied into entry A(0) as shown. This will correct the error at that location prior to subsequent compare operations so that improper results do not occur. The FNH bit can change dynamically depending on the particular application desired. Regardless of where the bit is set, the present duplicative entries and the mechanism of detecting, identifying, and copying to correct erroneous entries can be applied to support FNH or the absence thereof.FIG. 6 illustrates the modularity by which the duplicative entries can occur in a CAM. In particular, it is not needed that all entries be duplicated. Instead, maybe only one block, two blocks, but not necessarily all blocks of entries may be duplicated. In the example shown, 64 blocks might exist in, for example, a 20 Mb CAM. Each block is labeled with reference numeral 50. However, possibly only two blocks labeled 50*a* and 50*b* contain entries that are mirrored at blocks labeled 50*c* and 50*d*. Thus, the CAM is arranged so that whatever values are written into block 50*a* are also written into block 50*c*, and whatever values are written into block 50*b* are also written into block 50*d*. Having the duplicative block not only allows for error detection within blocks 50*a-d*, but also affords error correction at the time in which a search operation is carried out.

Having modularity allows the user to tailor certain blocks that are most critical for routing purposes to be more reliable than blocks that are not replicated. Thus, the lookup table information associated with Blocks 0 and 5-63 may not be as critical as the information within Blocks 1-4. Being able to design the CAM so that one or more blocks can be replicated takes into account that whenever blocks are replicated, the overall capacity of the lookup table in the CAM is diminished, yet reliability is enhanced. Therefore, the present modularity allows granularity to be applied in order to protect, for example, certain important access control list tables that require high reliability, yet do so sparingly so as not to unduly diminish the overall lookup capacity.

Figure 7:
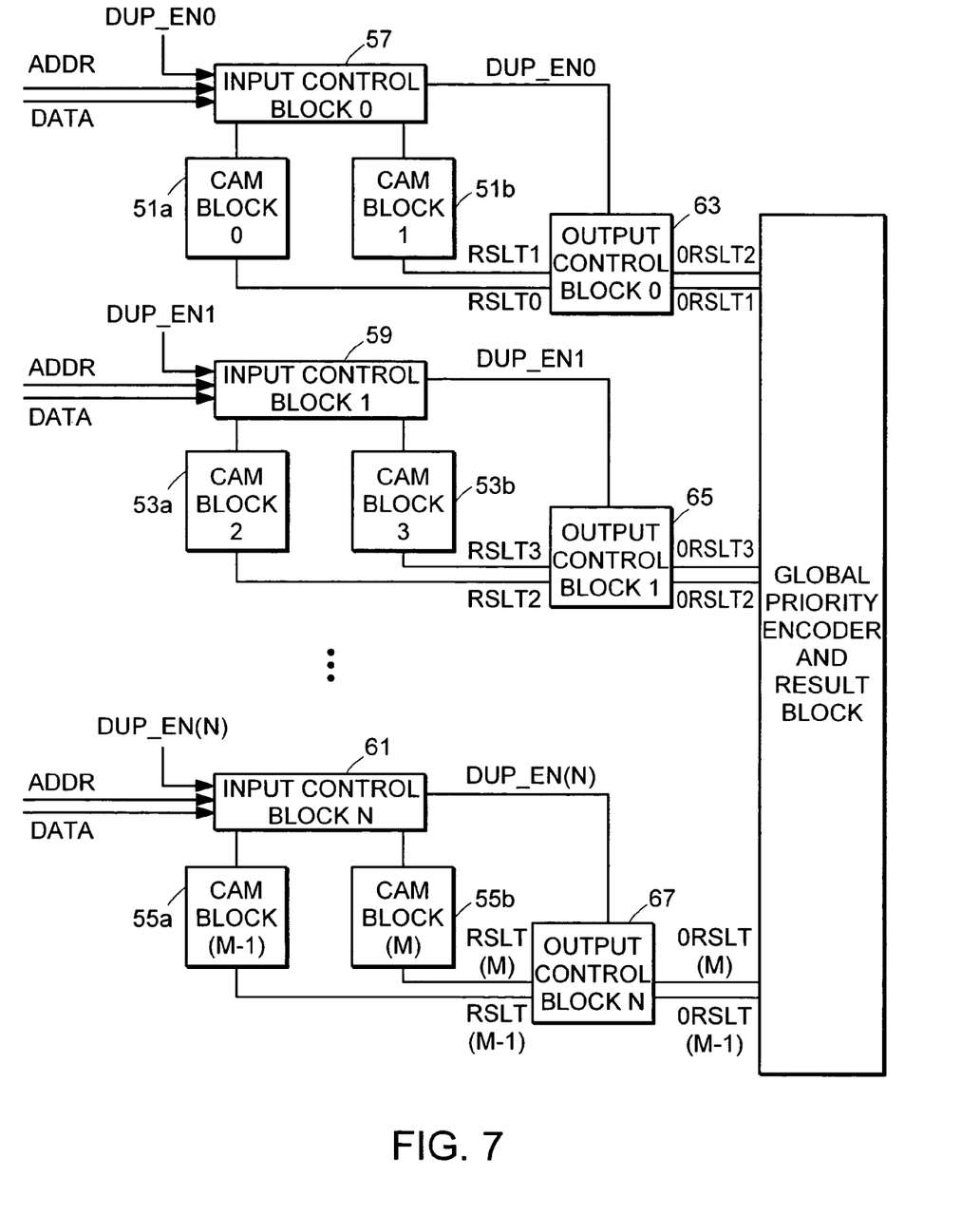
FIG. 7 is a block diagram of a CAM segregated into block pairs with an input control circuit and output control circuit implementing programmable error detection and correction per block pair.
Figure 8:
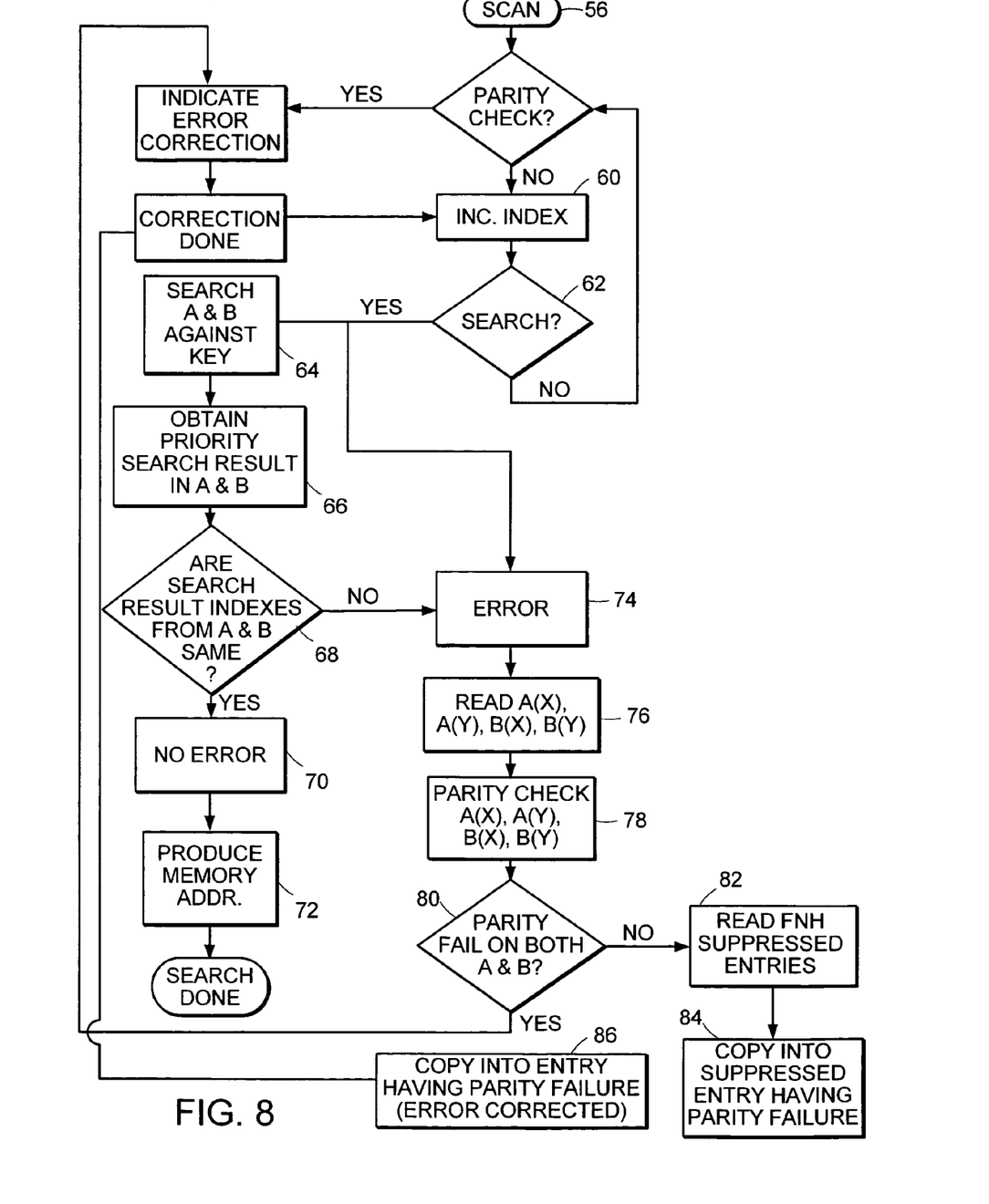
FIG. 8 is a flow diagram of error detection, error location identification, and error correction during a search operation intermittent between error scan operations.

FIG. 7 illustrates an example of a CAM implementation allowing modular assignment of blocks having duplicative and non-duplicative entries. The CAM is organized into multiple block pairs 51*a*/51*b*, 53*a*/53*b* and 55*a*/55*b*, each pair having a dedicated input control block 57, 59 and 61, respectively, as well as a dedicated output control block 63, 65 and 67, respectively. The input control block 0 (reference number 57) is configured to select whether CAM block 0 and CAM block 1 are mirrored copies of each other or distinct from each other. More specifically, when configured in one mode, the input control block acts as a "splitter" and decodes an incoming write address to the same location within both CAM blocks. In this configuration the contents of CAM blocks 0 and 1 represent duplicative versions of a single lookup table. When configured in another mode, the input control block 57 decodes an incoming write to the uniquely addressed location in either CAM block 0 or CAM block 1. In this configuration the contents of CAM blocks 0 and 1 represent distinct lookup tables. Based on the DUP_EN signal, the output control block 63 is configured to provide either a single search result from the CAM block pair, or a distinct search result from each of CAM blocks 0 and 1. By independently configuring the input control blocks in the CAM, any arbitrary subset of CAM block pairs may be selected to perform error detection and correction via table mirroring. FIG. 8 illustrates the methodology of using mirrored entries and performing error detection, location, and correction during a search operation in the interim between possible scan operations. For example, a scan operation, alternatively known as parity scrubbing, may be undertaken in sequence through the CAM entries. The scan operation can begin as shown by reference 56. Essentially, the binary values of a particular index are read and compared with the one or more parity bits during parity check operation 58. Depending on the number of parity bits, one or more single bit binary values can be checked for error. For example, if only one binary value need be checked, then only a singl parity bit is used. However, if more than binary value must be checked, then more than one parity bit can be used. After parity check operation is performed at that index, the index is incremented 60. If a search does not occur in the interim, then parity check is repeated on the incremented index location and so forth.

However, if a search 62 occurs in the interim, then the first and second sets of CAM locations A and B are searched in parallel against a search key 64. The first location that yields a match in each set of CAM locations is recorded at step 66. If there is no offset between the indices in the first and second sets of CAM locations, shown by decision block 68, then no error is reported 70. The index that is, therefore, the same in the first and second CAM locations will be output as an address 72 to the memory in order to complete the lookup operation and produce the next hop address. Once the search operation is complete, parity check resumes at step 58 until the next search operation 62 occurs. Thus, parity scrubbing can occur in the interim between searches.

If an offset exists between the search results, then an error 74 is reported. The compare result will, therefore, not be undertaken until the error is corrected. In order to correct the error, a read operation 76 takes place at both the first and second CAM locations, for both indices X and Y. A parity check 78 then occurs for each of the four sets of binary values to determine if a parity error occurs 80. If a parity failure is not reported, then most likely the first location reporting a hit has been suppressed through use of, for example, an FNH bit set at that index. This will force a read of the suppressed entries 82. Based on the outcome of a parity check, the suppressed index value having a parity error will be copied 84 from the opposing set of CAM locations having the same index value. If a parity failure exists at decision block 80, then most likely the FNH bit is not set at the X and Y index values chosen. Therefore, the entry having a parity failure can be copied to during step 86.

It will be appreciated to those skilled in the art having the benefit of this disclosure, that the embodiments described herein are believed to be applicable to a CAM having RAM cells. Regardless of whether the CAM is a binary or ternary CAM, each CAM cell can encounter soft errors such that those errors can be discovered during a search operation. Once an error is discovered, the priority encoder simply outputs an error signal along with certain read commands. The read commands allow for the present CAM to isolate and correct the error so that when the next search occurs at that index location, no error will be reported. The search operation and resulting correction occurs while background parity scrubbing is undertaken in the interim between searches. While background parity scrubbing alone cannot detect certain errors if that entry being searched has not yet been scrubbed, the combination of background parity scrubbing and error correction during search will ensure an even higher reliability result. At regular intervals, the entries can be scanned sequentially to locate any entries that have a mismatch.

It is appreciated to the skilled artisan that the CAM is organized into two parts, with the CAM entries of one being entered twice (and thus the mirror of the other set of CAM entries). Searches are performed in parallel in both parts and the results are compared. The mismatch results can be determined and, through use of parity bits, the error located immediately in the case of single bit errors or, possible, multi-bit errors depending on the number of parity bits assigned to each entry. Those skilled in art will also appreciate from this disclosure that the reliable error correction feature of the present CAM will support FNH bits possibly set in some blocks, but not others. FNH can be assigned by a user that may want to suppress a hit on a portion of a searched database. According to various dynamic service agreements, the user will be allowed an opportunity to set the FNH bit on some entries so that certain entries will not be forwarded, yet allowing all other entries to be forwarded. The FNH bit can be set at periodic intervals to change the priorities given to those entries.

It will be appreciated that error detection and correction is transparent to the CAM through use of copies of the database. This allows a user to configure portions of the CAM as highly protected, while other portions of the CAM need not be duplicated and, therefore, are less protected. A deterministic number of cycles are used to locate entries that have bit errors, while supporting FNH functionality with the ability to coexist and work in tandem with background parity scrubbing or error correction scan engine functionality. Utilizing duplicate copies of the database within first and second sets of CAM locations allows the present CAM to determine false hits in instances of soft error failures and locate the entry with the error. Thereafter, the error can be corrected by reading the entries at each index value and within each of the two sets of CAM locations. If both CAM entries at a particular index have a parity error, then that error is reported to the host CPU to allow the host to rewrite correct data into those entries sharing a common index value. The following claims are to be interpreted to embrace all such modifications and changes, and the specification and drawings are to be regarded in an illustrative rather than a restrictive sense.

What is claimed is:

1. A content addressable memory (CAM), comprising:
   a first set of CAM locations coupled to store a first set of values;
   a second set of CAM locations coupled to store a second set of values;
   an input control circuit coupled to the first and second sets of CAM locations and operable in an error detection mode and a normal mode, wherein the second set of values is a copy of the first set of values when the input control circuit is in the error detection mode, and wherein the second set of values is independent from the first set of values when the input control circuit is in the normal mode; and
   a comparator coupled to compare a search key value against the first and second set of values and report an error if a first location within the first set of CAM locations that produces a match is different from a first location within the second set of CAM locations that produces a match when the input control circuit is in the error detection mode.

2. The CAM as recited in claim 1, wherein the search key value comprises a destination address within a packet of information.

3. The CAM as recited in claim 1, further comprising a plurality of priority encoders that provide a priority order by which the first and second sets of values within the respective first and second sets of CAM locations is compared against the search key value relative to other sets of values in other locations within the first and second sets of CAM locations.

4. The CAM as recited in claim 1, further comprising a third set of CAM locations coupled to store a non-duplicative third set of binary values dissimilar from the first and second set of Values, and the combination of first, second and third sets of CAM locations encompasses the entirety of locations within the CAM.

5. The CAM as recited in claim 1, further comprising one or more error detection encoded bits corresponding to each of the first and second sets of values.

6. The CAM as recited in claim 5, further comprising an error location circuit coupled to:
   check the first and second sets of values using the error detection encoded bits to determine which one of the first or second sets of values is in error;
   record, as a result of the check, whether the error is within the first set of values, the second set of values, both the first and second sets of values; and
   record, as a result of the check, the index value corresponding to the set of values that is not in error.

7. The CAM as recited in claim 6, further comprising an error correction circuit coupled to (i) receive the set of values within the second set of CAM locations and at the same index value as the first set of values; and (ii) write the set of values into the first set of values if the error is within first set of values.

8. The CAM as recited in claim 6, further comprising an error correction circuit coupled to (i) receive a set of values within the first set of CAM locations at the same index value as the second set of values, and (ii) write the set of values into the second set of values if the error is within the second set of values.

9. The CAM as recited in claim 6, further comprising an error correction circuit coupled to (i) receive an index value corresponding to the set of values not in error within the first set of CAM locations; (ii) receive an index value corresponding to the set of values not in error within the second set of CAM locations, and (iii) select an index value based on a priority order by which the sets of values within the first and second sets of CAM locations are compared against the search key value relative to other sets of values within the first and second set of CAM locations.

10. The CAM as recited in claim 6 further comprising an error correction circuit coupled to signal a con-correctable error if the error is in both the first and second sets of values.

11. The CAM as recited in claim 1, further comprising:
a match suppression bit associated with both the first set of values and the second set of values; and wherein
the comparator is configured to report an error if the first location within the first set of CAM locations that produces a match is different from the first location within the second set of CAM locations that produces a match, regardless of whether the match suppression bit is a set when the input control circuit is in the error detection mode.

12. The CAM as recited in claim 11, further comprising a read logic circuit coupled to keep track of the first location within either the first set of CAM locations or the second set of CAM locations in which the match occurs if the match suppression bit is set at that location.

13. The CAM as recited in claim 12, further comprising:
one or more error detection encoded bits corresponding to each of the first and second sets of values; and
an error location circuit coupled to check the first and second sets of values using the error detection encoded bits and to record, as a result of the check, whether the error is within the first set of values, the second set of values, or both.

14. The CAM as recited in claim 13, wherein the error location circuit is coupled to perform the check for the corresponding sets of values in the opposing first and second sets of CAM locations corresponding to the same index as the first and second sets of values and to record, as a result of the compare, where the error exists within the set of values.

15. The CAM as recited in claim 14, further comprising an error correction circuit coupled to (i) receive the set of values within the second set of CAM locations and at the same index value as the first set of values; and (ii) write the set of values into the first set of values if the error is within the first set of values.

16. The CAM as recited in claim 14, further comprising an error correction circuit coupled to (i) receive the set of values within the first set of CAM locations at the same index value as the second set of values; and (ii) write the set of values into the second set of values if the error is within the second set of values.

17. A content addressable memory (CAM), comprising:
a first block of CAM locations;
a second block of CAM locations; and
an input control circuit operable in an error detection mode to receive a set of values and to store the set of values in the first block of CAM locations and a copy of the set of values in the second block of CAM locations, and operable in a normal mode to receive first and second sets of values and to store the first set of values in the first block of CAM locations and the second set of values in the second block of CAM locations.

18. The CAM as recited in claim 17, further comprising an output control circuit coupled to:
receive a signal from the input control circuit indicating whether the set of values stored in the second block of CAM locations is a copy of the set of values stored in the first block of CAM locations; and
select a first set of values from the first block of CAM locations, a second set of values from the second block of CAM locations, or both the first and second sets of values from the respective first and second blocks of CAM locations.

19. The CAM as recited in claim 18, wherein the output control circuit provides a priority order by which the first set of values from the first block of CAM locations and the second set of values from the second block of CAM locations are compared against a search key value relative to other sets of values within the first and second blocks of CAM locations.

20. The CAM as recited in claim 18, further comprising an error location circuit coupled to compare a search key value against the first and second sets of values and report an error if a first location within the first block of CAM locations that produces a match is different from a first location within the second block of CAM locations that produces a match.

21. The CAM as recited in claim 18, further comprising a plurality of CAM block pairs, wherein each pair is coupled to operate independent of other CAM block pairs.

22. A method of operation within a content addressable memory (CAM), comprising:
selecting between an error detection mode of operation and a normal mode of operation in response to a signal received by an input control circuit;
storing a first set of values in a first set of CAM locations and a duplicative set of values in a second set of CAM locations when the error detection mode is selected;
searching for matches between a key and duplicative sets of values within the respective first and second sets of CAM locations;
recording the first location within the first set of CAM locations and the first location within the second set of CAM locations that produce a match; and
generating an error if the first location within the first set of CAM locations is at a different index than the first location within the second set of CAM locations.

23. The method as recited in claim 22, further comprising:
checking the first and second sets of values using one or more error detection encoding bits to determine which one of the first or second sets of values is in error; and
depending on the outcome of said checking, recording which of the duplicative sets of values is in error.

24. The method as recited in claim 22, further comprising:
copying over one of the duplicative sets of values within the first set of CAM locations having a recorded error from a set of values within the second set of CAM locations and having the same index as the first set of CAM locations if there was no error recorded at an index in the second set.

25. The method as recited in claim 22, further comprising:
copying over one of the duplicative sets of values within the second set of CAM locations having a recorded error from a set of values within the first set of CAM locations and having the same index as the second set of CAM locations if there was no error recorded in an index in the first set.

26. The method as recited in claim 22, further comprising:
   detecting whether a hit suppression bit is set in the first location within the first and second set of CAM locations that produces a match.

27. The method as recited in claim 22, further comprising allowing a scan operation to occur in parallel with said searching and recording to enhance reliability within the CAM.

28. The method as recited in claim 22, further comprising allowing a parity or error detection scan operation to occur in parallel with said searching and recording to capture errors within both the first and second sets of CAM locations.

29. The method as recited in claim 22, further comprising configuring the first and second sets of CAM locations to selectively store duplicative values.

30. The method as recited in claim 22, further comprising selecting a single search result from the combined first and second sets of CAM locations, or selecting a first search result from the first set of CAM locations and a second search result from the second set of CAM locations.

31. The CAM as recited in claim 17, wherein the input control circuit comprises circuitry to activate a plurality of word lines in response to receiving an incoming write address, wherein a first one of the plurality of activated word lines is coupled to the first block of CAM locations and a second one of the plurality of activated word lines is coupled to the second block of CAM locations.

* * * * *